(12) United States Patent
Sorensen

(10) Patent No.: US 6,666,503 B1
(45) Date of Patent: Dec. 23, 2003

(54) POP-UP VEHICLE WIND DEFLECTOR

(75) Inventor: Craig L. Sorensen, Marysville, OH (US)

(73) Assignee: Honda Giken Kogyo Kabashiki Kaishu, Tokyo (JP)

( * ) Notice: Subject to any disclaimer, the term of this patent is extended or adjusted under 35 U.S.C. 154(b) by 0 days.

(21) Appl. No.: 10/256,995

(22) Filed: Sep. 27, 2002

(51) Int. Cl.$^7$ .................................................. B60J 7/22
(52) U.S. Cl. ...................................................... 296/217
(58) Field of Search ......................................... 296/217

(56) References Cited

U.S. PATENT DOCUMENTS

| | | | |
|---|---|---|---|
| 4,395,939 A | * 8/1983 | Hough et al. | |
| 4,681,364 A | 7/1987 | Bienert et al. | 296/217 |
| 4,781,410 A | 11/1988 | Ganter et al. | 296/217 |
| 4,844,538 A | 7/1989 | Ricks | 296/217 |
| 4,971,387 A | 11/1990 | Bohm et al. | 296/217 |
| 5,018,782 A | * 5/1991 | Fiegel et al. | 296/217 |
| 5,018,783 A | 5/1991 | Chamings et al. | 296/219 |
| 5,052,746 A | 10/1991 | Reihl et al. | 296/217 |
| 6,164,717 A | 12/2000 | Haagen | 296/217 |
| 6,273,501 B1 | 8/2001 | Raasakka et al. | 296/217 |
| 6,457,769 B2 | * 10/2002 | Hertel et al. | 296/217 |

FOREIGN PATENT DOCUMENTS

| | | | | |
|---|---|---|---|---|
| DE | 3922939 | * | 7/1990 | 296/217 |
| EP | 490213 | * | 5/1992 | 296/217 |

* cited by examiner

*Primary Examiner*—Dennis H. Pedder
(74) *Attorney, Agent, or Firm*—James R. Eley, Esq.; Michael A. Forhan, Esq.; Thompson Hine LLP

(57) ABSTRACT

A method and apparatus for a pop-up vehicle wind deflector. The wind deflector comprises a lower frame member coupled to the vehicle proximate an opening in the roof, an upper frame member pivotably coupled to the vehicle proximate the opening, a flexible material coupled between the upper and lower frame members and a biasing means acting upon the upper frame member effective to extend the upper frame member away from the lower frame member. The flexible or elastic material coupled to the upper and lower frame members provides a wind-confronting surface when the upper frame member is extended away from the lower frame member. The upper frame member may be upwardly bowed to provide additional tension on the central portion of the flexible material when the upper frame member is extended away from the lower frame member.

7 Claims, 3 Drawing Sheets

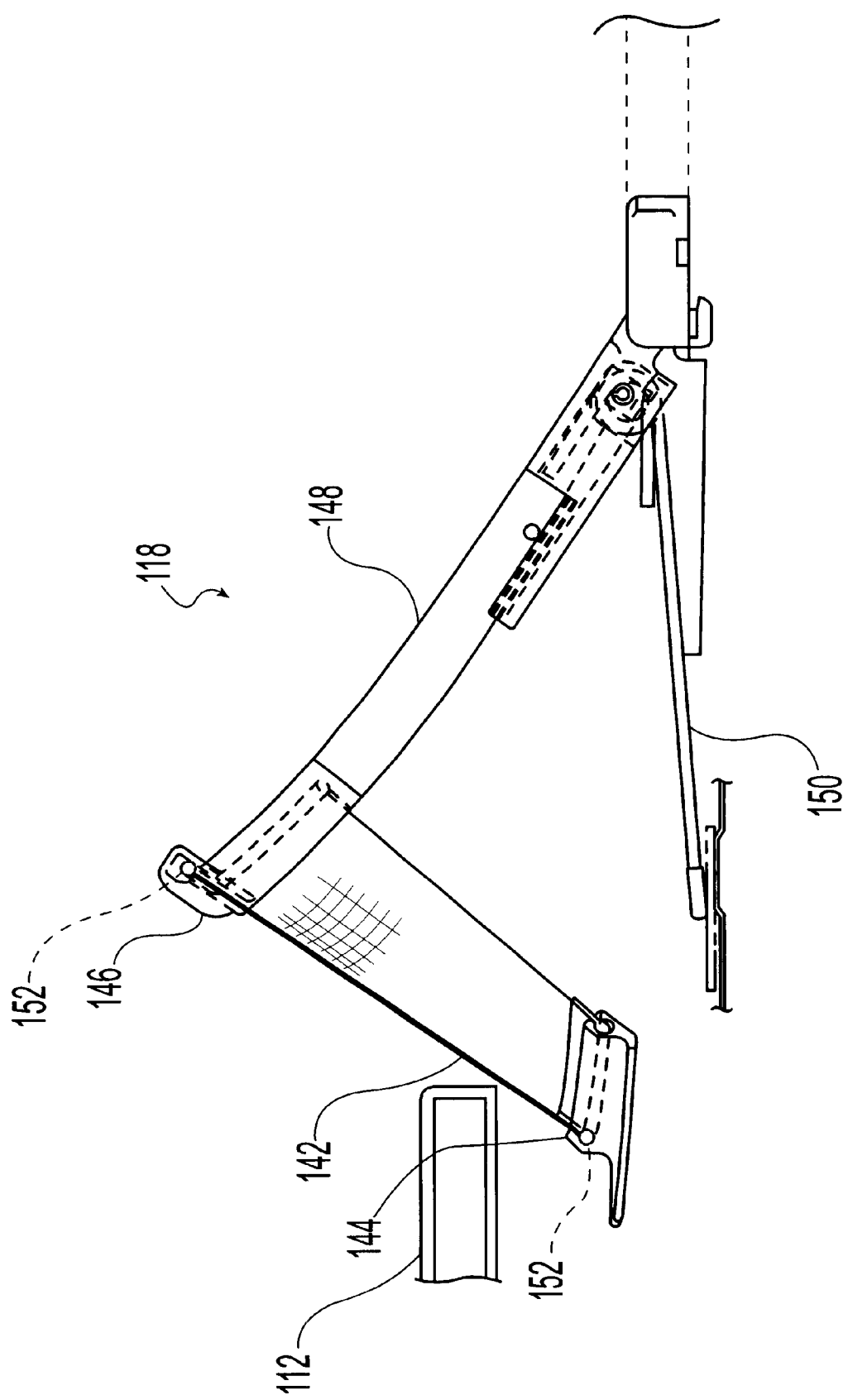

POP-UP VEHICLE WIND DEFLECTOR

FIELD

The inventive embodiments are directed towards a stowable wind deflector for an automobile.

BACKGROUND

Many vehicles are manufactured or retrofitted in the aftermarket with manual and power sunroofs that may include automatic or permanent wind deflectors to keep unwanted wind and noise from lessening the driving experience. A wind deflector is a device that generally projects upwardly along the front edge of a sunroof opening. As a vehicle moves forward, the wind deflector deflects the air to reduce turbulence which in turn lessens wind noise as it passes directly over the opening. Some wind deflectors are accessory-type devices, which may be affixed to the top of a vehicle and constantly deflect wind regardless of whether the sunroof is open or closed. Deflectors used in connection with powered sunroofs are generally retractable and spring-loaded, closing when the sunroof closes and opening when the sunroof opens. The latter are typically used with powered sunroofs because it is relatively easy to incorporate the stowing and deployment of the deflector into the sliding motion of the sunroof panel.

A manual sunroof generally allows a user to detach the sunroof panel from one or more clasps, or other fastening means, and then remove it. This type of sunroof is typically stored in a trunk or other location until it is reinstalled. Most manual sunroofs include one or more hooks or forks located on the front side of the sunroof panel for positioning and securing it within the opening.

The current trend in deflector design is to make them from a flexible material of some sort, such as a mesh fabric, stretched between members of a collapsible frame. The use of the flexible mesh material reduces weight to an extent and provides for compact storage while still giving adequate wind deflection when deployed.

A problem that arises with this type of wind deflector is variations in the tension asserted on the flexible material when the deflector is extended. The configuration of the frame members subjects the flexible material to tension that is higher at either end portion of the wind deflector than at the central portion. This results in unsightliness and reduced efficiency in deflecting the wind. In some cases, the wind deflector can actually increase the noise level in the automobile due to resonance of the flexible material.

A wind deflector system that permits a user to easily store a wind deflector in a compressed position during installation of the sunroof is needed. It is further desirable to provide for substantially uniform tautness of the flexible material during deployment to improve the deflector's appearance and efficiency.

SUMMARY

One of the inventive embodiments provides for an upper member of the wind deflector frame configured so as to provide a substantially uniform tautness in the flexible material when the wind deflector is deployed in an extended position.

Further features of the inventive embodiments will become apparent to those skilled in the art to which the embodiments relate from reading the specification and claims, with reference to the accompanying drawings.

BRIEF DESCRIPTION OF THE DRAWINGS

FIG. 3 is a side view of the assembled pop-up wind deflector in its deployed condition in accordance with the invention.

DESCRIPTION OF THE PREFERRED EMBODIMENT(S)

Figure 1A:
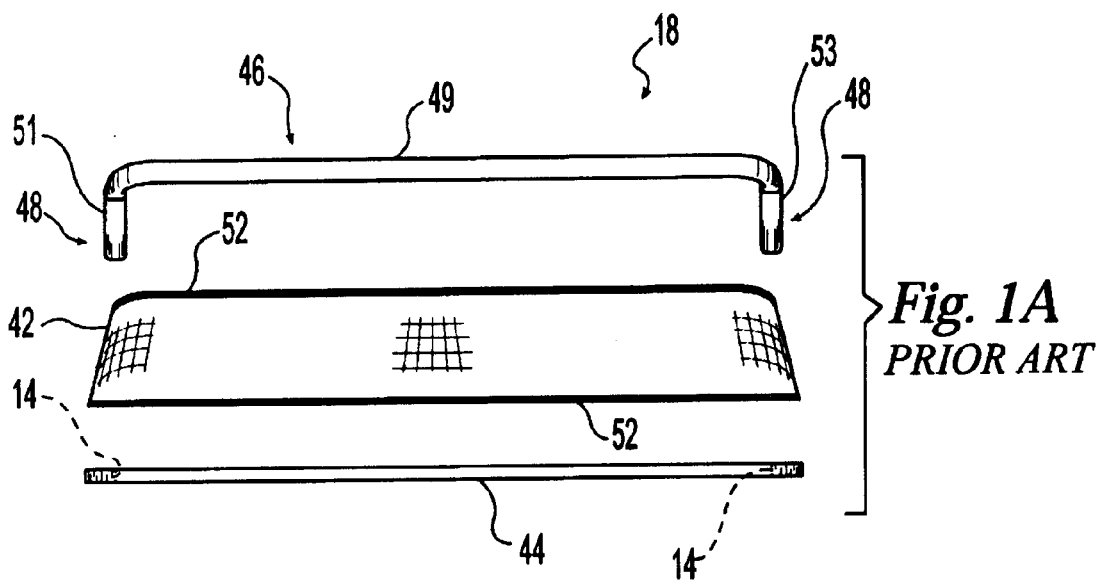
FIG. 1A is an isometric exploded view of the pop-up wind deflector in accordance with prior designs.
Figure 1B:
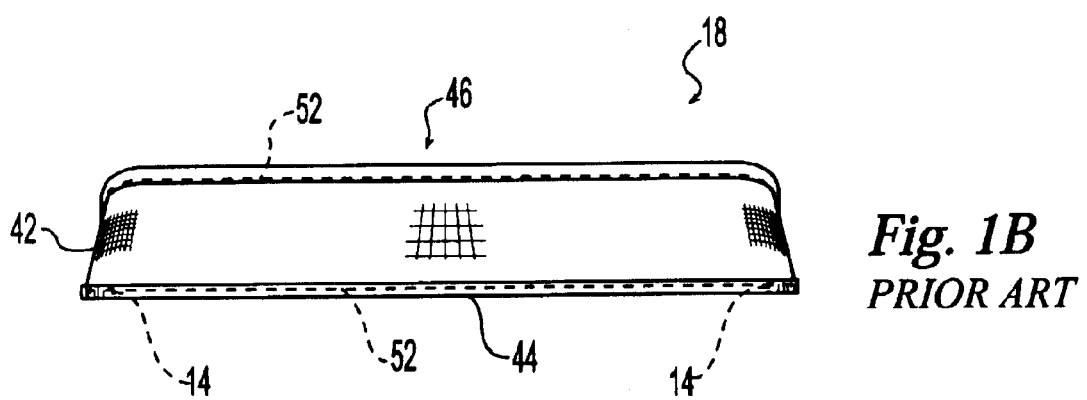
FIG. 1B is an isometric assembled view of the deployed pop-up wind deflector in accordance with the prior designs.

With reference to FIGS. 1A and 1B, a pop-up wind deflector assembly 18 providing a wind-confronting surface according to a preexisting design is shown. The deflector assembly 18 may be comprised of a flexible material 42 coupled between a lower frame member 44, which may be fabricated as an extrusion, molded, tubular or other structurally suitable form, and an upper frame member 46, which may be of like construction. The lower frame member 44 is preferably coupled to the vehicle proximate to or inside the sunroof opening of the roof (not shown).

The upper frame member 46 may be coupled to pivoting arms 48, one or more of which are upwardly biased, that may likewise be pivotally coupled to the vehicle proximate the sunroof opening (not shown). The upper frame member 46 and pivoting arms 48 may be fabricated as a single, integral piece if desired. The upper frame member includes a central portion 49 and two ends 51, 53.

The flexible material 42 may be mesh or non-mesh fabricated from natural or synthetic material or other suitable, foldable stock, such as pliable plastic or other resilient material. The flexible material 42 may also be a substantially elastic material, such as Spandex® or like material. The flexible material 42 may be folded, wound onto a captive reel or configured in an accordion fashion for storage while in its retracted position.

The pivoting arms 48 may be biased with a biasing means, such as a coiled or leaf spring or other suitable resilient device for automatic deployment of the deflector assembly 18 from its retracted position. The biasing means acts on one of the upper frame member 46 and the lower frame member 44 and is effective to extend the upper frame member 46 away from the lower frame member 44 when deployed. The lower and upper frame members 44 and 46, respectively, and the flexible material 42 may be coupled and secured with a retaining means such as suitable hardware and/or adhesive substances to the roof, pivoting arms 48 and each other, as appropriate. The flexible material 42 may optionally include one or more beads as at 52 configured to couple with channels (not shown) in the lower frame member 44 and upper frame member 46. When the upper frame member 46 is extended away from the lower frame member 44, the flexible material 42 provides a wind confronting surface. The wind confronting surface disturbs the flow of air in the area proximate and into the sunroof opening in order to reduce noise and resonance.

Figure 1C:
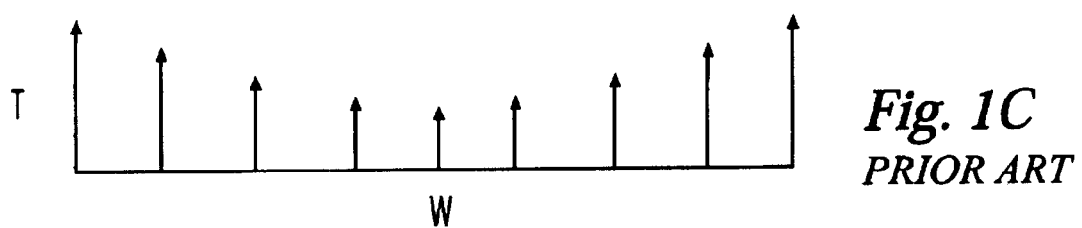
FIG. 1C is a diagram of the relative tension across the width of the pop-up wind deflector in accordance with prior designs.

FIG. 1C, with continued reference to FIGS. 1A and 1B, is a generalized diagram of the relative variations in tension T across the width W of the wind deflector 18. The tension can be seen to be greater at the edges than at the center. This variation in tension, if not compensated, will likely produce a wind deflector having a central portion that is slack to the touch. The reason for the variation in tension is a matter of the proximity of the mesh material to the source of the tension. In the structure shown in FIGS. 1A–1C, the ends 51, 53 of the upper frame member 46 are closer than the central portion 49 of the upper frame member 46 to the biasing means. As the biasing means extends the upper frame member 46 away from the lower frame member 44, it exerts a constant force in an upward direction. The force is lower the further away from the biasing means 50 a particular portion of the upper frame member 46 is. The ends 51, 53 of the upper frame member 46, being closer to the biasing means, are subject to a higher force than that in the central portion 49 of the upper frame member 46. Because of this difference in force, the tension imparted to the portion of the flexible material 42 adjacent the central portion 49 of the upper frame member 46 is lower than the tension imparted to the portions of the flexible material 42 adjacent the ends 51, 53 of the upper frame member. This creates a discontinuity in tension across the surface of the flexible material 42, which negatively affects the performance of the deflector assembly 18.

Figure 2A:
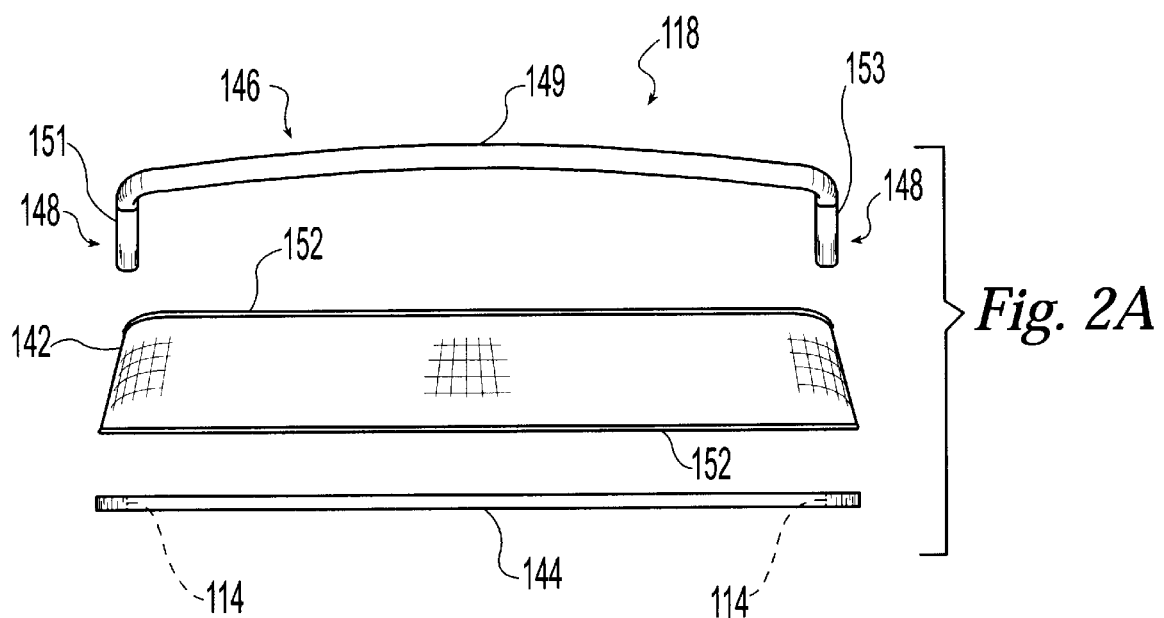
FIG. 2A is an isometric exploded view of the pop-up wind deflector having a tension-compensating upper member in accordance with the invention.
Figure 2B:
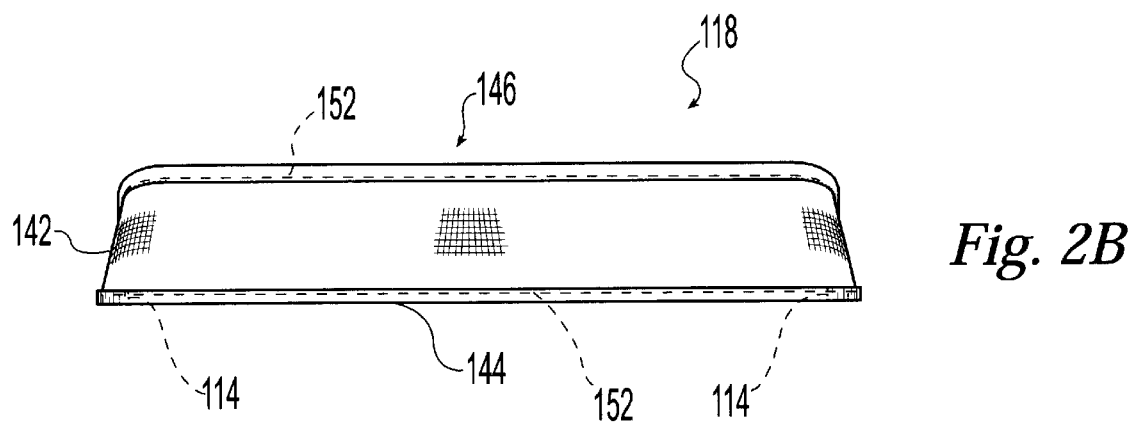
FIG. 2B is an isometric assembled view of a deployed pop-up wind deflector having a tension-compensating upper member in accordance with the invention.

With reference to FIGS. 2A, 2B, and 3, a pop-up wind deflector assembly 118 providing a wind-confronting surface according to several inventive embodiments of the present disclosure is shown. The deflector assembly 118 may be comprised of a flexible material 142 coupled between a lower frame member 144, which may be fabricated as an extrusion, molded, tubular or other structurally suitable form, and an upper frame member 146, which may be of like construction. The upper frame member 146 is shown to be shaped to be upwardly bowed or arched. The lower frame member 144 is preferably coupled to the vehicle proximate to or inside a sunroof opening 114 of a roof 112.

The upper frame member 146 may be coupled to pivoting arms 148, one or more of which are upwardly biased, that may likewise be pivotally coupled to the vehicle proximate the sunroof opening 114. The upper frame member 146 and pivoting arms 148 may optionally be fabricated as a single, integral piece if desired. The upper frame member includes a central portion 149 and two end portions 151, 153. The upper frame member is preferably formed of one piece.

The flexible material 142 may be mesh or non-mesh fabricated from natural or synthetic material or other suitable, foldable stock, such as pliable plastic or other resilient material. The flexible material 142 may also be an elastic material, such as Spandex® or like material. The flexible material 142 may be folded, wound onto a captive reel or configured in an accordion fashion for storage while in its retracted position.

The pivoting arms 148 may be biased with a resilient device, such as a coiled or leaf spring or the like (not shown) for automatic deployment of the deflector assembly 118 from its retracted position. The biasing means 150 acts on one of the upper frame member 146 and the lower frame member 144 and is effective to extend the upper frame member 146 away from the lower frame member 144 when deployed. The lower and upper frame members 144 and 146, respectively, and the flexible material 142 may be coupled and secured with a retaining means such as suitable hardware and/or adhesive substances to the roof, pivoting arms 148 and each other, as appropriate. The flexible material 142 may optionally include one or more beads 152 configured to couple with channels in the lower frame member 144 and upper frame member 146. See FIG. 3. When the upper frame member 146 is extended away from the lower frame member 144, the flexible material 142 provides a wind confronting surface. The wind confronting surface disturbs the flow of air in the area proximate and into the sunroof opening in order to reduce noise and resonance.

Figure 2C:
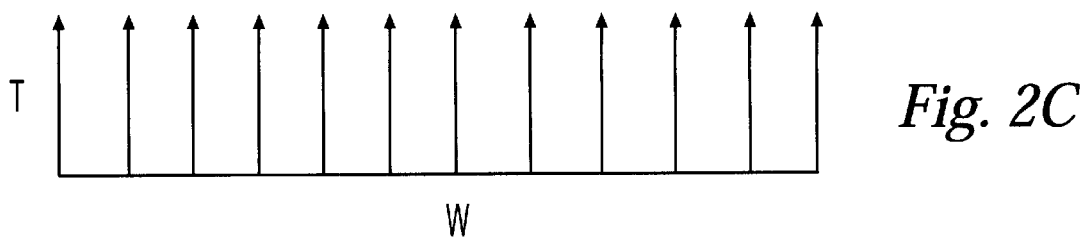
FIG. 2C is a diagram of the relative tension across the width of the pop-up wind deflector having a tension-compensating upper member in accordance with the invention.

FIG. 2C, with continued reference to FIGS. 2A, 2B, and 3, is a general diagram of the lack of relative variations in tension across the width of the wind deflector 118 having a bowed upper frame member 146. The tendency for the tension applied to the flexible material 142 to be greater at the end portions 151, 153 is compensated for by the upwardly-bowed upper frame member 146, which provides a predetermined amount of increased tension on the flexible material 142 at its central portion when compared to the tension of the flexible material 42 in the prior art deflector 18, as shown in FIG. 1C. The upward bow in the central portion 149 of the upper frame member 146 is used to achieve a substantially uniform tautness over the entire width of the deflector 118. When observed over the width W of the flexible material 142, as shown in FIG. 2C, when the upper frame member 146 is extended away from the lower frame member 144, a substantially uniform tension T is provided over the width W of the flexible material 142. Because the predetermined tension T is substantially uniform over the width W of the flexible material 142, the deflector 118 is more effective to reduce wind noise and resonance than the prior art deflectors.

While this invention has been shown and described with respect to a detailed embodiment thereof, it will be understood by those skilled in the art that various changes in form and detail thereof may be made without departing from the scope of the claims of the invention.

I claim:

1. A pop-up wind deflector mountable within a sunroof opening of a vehicle, comprising:
    a lower frame member coupled to the vehicle proximate the sunroof opening;
    an upper frame member coupled to the vehicle proximate the sunroof opening,
    wherein the upper frame member is upwardly bowed to provide a predetermined tension over the width of the flexible material when the upper frame member is extended away from the lower frame member;
    a biasing means acting upon one of the upper frame member and the lower frame member effective to extend the upper frame member away from the lower frame member when deployed; and
    a flexible material, coupled between the upper and lower frame members to provide a wind-confronting surface when the upper frame member is extended away from the lower frame member, the flexible material having a substantially uniform tension over the width of the flexible material.

2. The pop-up wind deflector of claim 1 wherein the flexible material is a mesh material.

3. The pop-up wind deflector of claim 1 wherein the flexible material is an elastic material.

4. A method for mounting a pop-up wind deflector within a sunroof opening of a vehicle, comprising the steps of:

coupling a lower frame member to the vehicle proximate the sunroof opening;

pivotably coupling an upper frame member to the vehicle proximate the sunroof opening;

wherein the upper frame member is upwardly bowed to provide a predetermined tension over the width of the flexible material when the upper frame member is extended away from the lower frame member;

providing a biasing means acting upon one of the frame members effective to extend the upper frame member away from the lower frame member during deployment of the deflector, and coupling a flexible material between the upper and lower frame members to provide a wind-confronting surface when the upper frame member is extended away from the lower frame member to provide a substantially uniform tension over the width of the flexible material.

5. The method of claim 4 wherein the flexible material is provided as a mesh material.

6. The method of claim 4 wherein the flexible material is provided as a non-mesh material.

7. The method of claim 4 wherein the flexible material is provided as an elastic material.

* * * * *